United States Patent
Polka

(10) Patent No.: US 9,561,687 B2
(45) Date of Patent: Feb. 7, 2017

(54) AERODYNAMIC WHEEL COVER ASSEMBLY AND METHOD OF MOUNTING

(71) Applicant: RealWheels Corporation, Gurnee, IL (US)

(72) Inventor: John Polka, Gurneee, IL (US)

(73) Assignee: RealWheels Corporation, Gurnee, IL (US)

(*) Notice: Subject to any disclaimer, the term of this patent is extended or adjusted under 35 U.S.C. 154(b) by 800 days.

(21) Appl. No.: 13/848,553

(22) Filed: Mar. 21, 2013

(65) Prior Publication Data

US 2014/0284994 A1   Sep. 25, 2014

(51) Int. Cl.
*B60B 7/06* (2006.01)
*B60B 7/04* (2006.01)
*B60B 7/14* (2006.01)
*B60B 7/00* (2006.01)

(52) U.S. Cl.
CPC .............. *B60B 7/04* (2013.01); *B60B 7/068* (2013.01); *B60B 7/14* (2013.01); *B60B 7/0073* (2013.01); *B60B 2900/113* (2013.01); *B60B 2900/1216* (2013.01); *B60B 2900/531* (2013.01); *Y10T 29/49826* (2015.01)

(58) Field of Classification Search
CPC .......... B60B 7/04; B60B 7/068; B60B 7/0073; B60B 2900/113; B60B 2900/531; B60B 2900/1216
USPC ....... 301/908.4, 37.376, 101, 37.102, 37.372
See application file for complete search history.

(56) References Cited

U.S. PATENT DOCUMENTS

| | | |
|---|---|---|
| 2,526,026 A | 10/1950 | Horn |
| 2,794,684 A | 6/1957 | Lyon |
| 3,532,385 A | 10/1970 | Foster et al. |
| 3,724,905 A | 4/1973 | Kachler |
| 3,988,039 A | 10/1976 | Spisak |
| 4,593,953 A | 6/1986 | Baba et al. |
| 4,725,100 A | 2/1988 | Patti |
| 4,761,040 A | 8/1988 | Johnson |
| 4,842,339 A | 6/1989 | Roulinson |
| 4,889,394 A | 12/1989 | Ruspa |
| 4,895,415 A | 1/1990 | Stay et al. |
| 4,974,909 A | 12/1990 | Patti et al. |
| 5,042,881 A | 8/1991 | Polka |
| 5,061,014 A | 10/1991 | Polka |
| 5,167,440 A | 12/1992 | FitzGerald |
| 5,222,785 A | 6/1993 | Green |
| 5,263,770 A | 11/1993 | Goudey |
| 5,294,189 A | 3/1994 | Price et al. |
| 5,358,313 A | 10/1994 | Polka |

(Continued)

FOREIGN PATENT DOCUMENTS

| | | |
|---|---|---|
| EP | 0200812 B1 | 9/1985 |
| EP | 0300538 B1 | 7/1988 |

OTHER PUBLICATIONS

Aerotech CAPS flyer. AeroTechCaps.com, Jenison, MI Date: Unknown.

*Primary Examiner* — S. Joseph Morano
*Assistant Examiner* — Jean Charleston
(74) *Attorney, Agent, or Firm* — Jansson Munger McKinley & Kirby Ltd.

(57) ABSTRACT

The present invention relates to attaching aerodynamic wheel covers to the wheel of a truck or other heavy duty vehicle, and to a method of installation that requires less tooling for installation while substantially completely covering the wheel.

24 Claims, 6 Drawing Sheets

(56) References Cited

U.S. PATENT DOCUMENTS

| | | | |
|---|---|---|---|
| 5,366,278 A | 11/1994 | Brumfield | |
| 5,366,279 A | 11/1994 | Polka | |
| RE35,497 E | 4/1997 | Carter, III | |
| 5,630,653 A | 5/1997 | Polka | |
| 5,770,797 A | 6/1998 | Lapohn | |
| 5,795,035 A | 8/1998 | Fuller | |
| 5,823,635 A | 10/1998 | Polka | |
| 6,378,954 B1 | 4/2002 | Polka | |
| 6,386,642 B2 | 5/2002 | Maloney et al. | |
| 6,409,277 B2 | 6/2002 | Nunes et al. | |
| 6,419,327 B1 * | 7/2002 | Renshaw | B60B 7/04 301/37.102 |
| 6,443,528 B1 | 9/2002 | Polka | |
| 6,467,852 B1 | 10/2002 | Polka | |
| 6,585,330 B2 * | 7/2003 | Bruce | B60B 7/0013 301/37.372 |
| 6,595,596 B1 | 7/2003 | Polka | |
| 6,682,151 B1 | 1/2004 | Van Houten et al. | |
| 6,820,475 B2 * | 11/2004 | Wallach | B60B 7/006 301/108.1 |
| 6,983,998 B2 | 1/2006 | Litzka | |
| 7,059,684 B1 | 6/2006 | Polka | |
| 7,218,210 B2 | 5/2007 | Schoenberger et al. | |
| 7,611,211 B1 * | 11/2009 | Roberts | B60B 7/0046 301/37.31 |
| 7,677,677 B1 | 3/2010 | Roberts | |
| 8,677,623 B1 * | 3/2014 | Rayburn | B60B 7/068 29/894 |
| 2005/0073192 A1 * | 4/2005 | Bruce | B60B 7/14 301/37.373 |
| 2005/0199328 A1 | 9/2005 | Schoenberger et al. | |
| 2009/0224597 A1 | 9/2009 | Wood | |
| 2013/0015698 A1 | 1/2013 | Butler et al. | |

\* cited by examiner

AERODYNAMIC WHEEL COVER ASSEMBLY AND METHOD OF MOUNTING

BACKGROUND OF THE INVENTION

Owners and operators of trucks, tractors, trailers, recreational vehicles and other heavy duty vehicles desire to increase the gas mileage of such vehicles, particularly as gas prices rise, by adding aerodynamic enhancements. Such aerodynamic enhancements include adding wheel covers to such vehicles. Nuts and bolts typically extend out from the rims of the wheels on such vehicles, the rims may protrude or the wheels may be extremely concave increasing the drag and reducing the optimal performance of the vehicle. Owners of such vehicles also desire to customize them by providing decorative wheel covers to enhance the otherwise unattractive wheels thereof. Thus, there is a need for an aerodynamic wheel cover that is durable, enhances the performance and gas mileage of the vehicle by reducing drag and improving the overall performance and appearance of the vehicle and its wheels. There is need for a wheel cover assembly and installation method that is easy to install and can be quickly assembled for use on a heavy duty vehicle.

The mounting assembly and associated wheel cover mounting method disclosed herein improve the wheel cover installation and removal process since the method requires a reduced number of tools and can be accomplished faster and simpler, with fewer parts than existing wheel cover mounting methods and mechanisms.

A significant source of drag on tractor-trailers includes the wheel assemblies of the vehicle. Such lead to increased transportation costs which are ultimately passed on to the consumers in the price of delivered products. In general, the aerodynamic drag of a vehicle increases when air flow is affected by a wheel opening. Such is particularly significant with deep wheel openings commonly found on heavy duty vehicles.

Consequently, there is a need for wheel covers that decrease drag. Accordingly, embodiments described herein provide mounting assemblies, mechanisms and methods for attaching cover assemblies, particularly aerodynamic wheel cover assemblies, to wheel assemblies which do not require the removal of the nuts retaining the wheel to the hub of the axle. In addition, there is a need for such a wheel cover assembly which allows the air pressure of tires on such wheels to be easily checked and adjusted when installed on the vehicle wheel.

SUMMARY OF THE INVENTION

In a preferred embodiment, a wheel cover and wheel cover assembly for covering a wheel of a vehicle is provided. It is preferred that the wheel cover provide aerodynamic enhancement to the vehicle, but it will be understood that in certain applications, enhancement of the appearance of the vehicle may be the first priority of the owner or user. The vehicle includes a hub surrounded by a plurality of parallel spaced studs, each of the studs having a longitudinal axis with a fixed distance between adjacent ones of the longitudinal axes. The wheel has a web with a plurality of holes therein for receiving the studs and a lug nut threaded on each of the parallel spaced studs to retain the wheel to the hub. The cover assembly includes a first retainer member having a planar portion for contacting at least two of the parallel spaced studs, the planar portion having a first mounting member attached to the first retainer member. A second retainer member is also provided which includes a planar portion for contacting at least two of the parallel spaced studs with the planar portion having a second mounting member attached to the second retainer member. The second retainer member is positioned across from the first retainer member when in contact with the at least two parallel studs. A first connecting member for contacting the first mounting member and a second connecting member for contacting the second mounting member are provided. When the cover is positioned for installation over the wheel and the first connecting member is in contact with the first mounting member and the second connecting member is in contact with the second mounting member, the cover is held in position mounted to the wheel substantially covering the wheel.

In another preferred embodiment the wheel cover and wheel cover assembly includes the first connecting member and the second connecting member each being positioned over the lug nuts threaded on at least two of the parallel spaced studs when in position contacting the spaced studs. The first connecting member and the second connecting member are each affixed to the respective parallel spaced studs with a threaded fastener. In another preferred embodiment the fastener is a nut.

In a further preferred embodiment of the wheel cover and wheel cover assembly, the first connecting member for contacting the first mounting member and the second connecting member for contacting the second mounting member are threaded fasteners, and may be bolts.

In another preferred embodiment, the wheel cover and wheel cover assembly include the first mounting member may be two receivers for receiving the first connecting member, and the second mounting member may be two receivers for receiving the second connecting member. In a further preferred embodiment, the wheel cover and wheel cover assembly include the two receivers for receiving the first connecting member and two receivers for receiving the second connecting member. The receivers may be spaced from each other on the first retainer member and second retainer member, respectively.

In a further preferred embodiment, the wheel cover and wheel cover assembly include the planar portion of the first retainer member first retainer member contacting more than two of the parallel spaced studs and the planar portion of the second retainer contacting more than two of the parallel spaced studs. In yet another preferred embodiment, the wheel cover and wheel cover assembly include the planar portion of the first retainer member and the planar portion of the second retainer member each placed in contact with the lug nuts on more than two of the spaced parallel studs. In yet a further preferred embodiment, the second retainer member is positioned symmetrically across from the first retainer member when in contact with the at least two parallel studs.

In another preferred embodiment, a method of mounting an aerodynamic wheel cover to a wheel of a vehicle includes the vehicle having a hub surrounded by a plurality of parallel spaced studs, each of the studs having a longitudinal axis and there being a fixed distance between adjacent ones of the longitudinal axes. The wheel has a web with a plurality of holes therein for receiving the studs and a lug nut threaded on each of the parallel spaced studs to retain the wheel to the hub and includes placing a first retainer member having a planar portion in contact with at least two of the parallel spaced studs, the planar portion having a first mounting member attached to the first retainer member. The method also includes placing a second retainer member having a planar portion in contact with at least two of the parallel spaced studs, the planar portion having a second mounting member attached to the second retainer member. The second retainer member is positioned across from the first retainer member when in contact with the at least two parallel studs. The method also includes placing a first connecting member in contact with the first mounting member and placing a second connecting member in contact with the second mounting member. The method also includes fastening the aerodynamic wheel cover to the first mounting member with the first connecting member and to the second mounting member with the second connecting member to thereby substantially cover the wheel.

Another preferred embodiment of the method includes placing the first connecting member in contact with the first mounting member with the first mounting member being two receivers spaced from each other for receiving the first connecting member and placing the first connecting member in contact with the two receivers A further preferred embodiment of the method includes placing the second connecting member in contact with the second mounting member with the second mounting member being two receivers spaced from each other for receiving the second connecting member and placing the second connecting member in contact with the two receivers.

In yet a further preferred embodiment, a method is provided which includes placing the planar portion of the first retainer member first retainer member in contact with at least two parallel spaced studs, the planar portion of the first retainer member first retainer member being placed in contact with more than two of the parallel spaced studs. In another preferred embodiment, the method includes placing the planar portion of the first retainer member in contact with at least two parallel spaced studs with the planar portion of the first retainer member first retainer member in contact with more than two of the lug nuts on more than two of the parallel spaced studs. Another preferred embodiment of the method includes placing a first retainer member having a planar portion in contact with at least two of the parallel spaced studs and placing a second retainer member having a planar portion in contact with at least two of the parallel spaced studs includes the second retainer member being positioned symmetrically across from the first retainer member when in contact with the at least two parallel studs.

BRIEF DESCRIPTION OF THE DRAWINGS

In order that the advantages of the invention will be readily understood, a more detailed description of the invention briefly described above will be rendered by reference to specific preferred embodiments that are illustrated in the appended drawings. Understanding that these drawings depict only typical preferred embodiments of the invention and are not therefore to be considered to be limiting of its scope, the invention will be described and explained with additional specificity and detail through the use of the accompanying drawings, in which.

DETAILED DESCRIPTION

Figure 1:
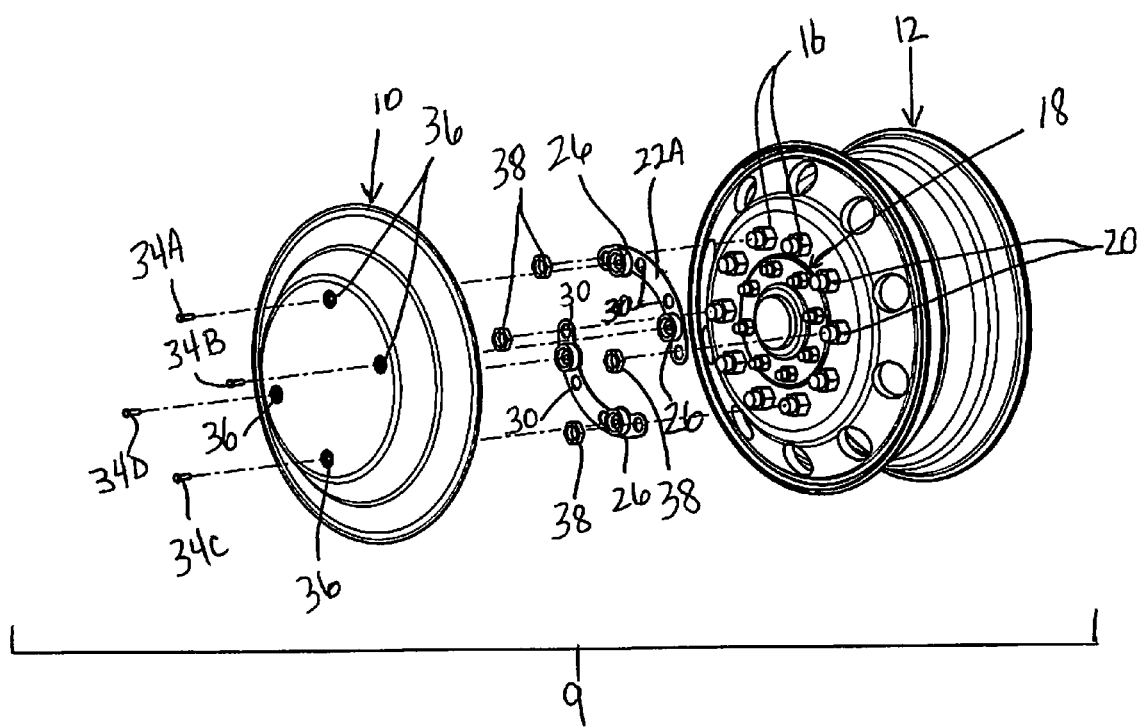
FIG. 1 is an exploded, isometric view of a preferred embodiment of the wheel cover and wheel cover assembly in accordance with the present invention.

A significant source of drag on tractor-trailers includes the wheel assemblies of the vehicle. Such leads to increased transportation costs which are ultimately passed on to the consumers in the price of delivered products. In general, the aerodynamic drag of a vehicle increases when air flow is affected by a wheel opening. Such is particularly significant with shallow wheel openings commonly found on the steerable or piloted wheels of a heavy duty vehicles including but not limited to tractor trailers, and other heavy duty vehicles.

Consequently, there is a need for wheel covers that decrease the overall drag caused by air resistance as the vehicle moves on the road. Accordingly, embodiments described herein provide mounting assemblies, mechanisms and methods for attaching cover assemblies, particularly aerodynamic wheel cover assemblies, to wheel assemblies. Such wheel assemblies include those which do not require the removal of the lug nuts retaining the wheel to the vehicle. In addition, there is a need for such a wheel cover assembly which allows the air pressure of tires on such wheels to be easily checked and adjusted when installed on the vehicle wheel.

Exemplary embodiments will now be described with reference to the accompanying drawings, in which exemplary embodiments are shown. This disclosure may, however, be embodied in many different forms and should not be construed as limited to the exemplary embodiments or materials set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Reference throughout this specification to "exemplary embodiment," "one embodiment," "an embodiment," "preferred embodiment," or similar language means that a particular feature, structure, or characteristic described in connection with the embodiment is included in at least one embodiment of the present invention. Thus, appearances of the phrases "in an exemplary embodiment," "in one embodiment," "in an embodiment," "in a preferred embodiment," and similar language throughout this specification may, but do not necessarily, all refer to the same embodiment.

As used herein, the term "wheel assembly" and "wheel assemblies" may refer to a single wheel or a dual wheel assembly, particularly as it relates to heavy duty vehicles including but not limited to tractor-trailer vehicles. An aerodynamic wheel cover and wheel cover assembly that is durable, enhances the performance and gas mileage of the vehicle by reducing air resistance and drag, and which improves the overall appearance of the vehicle and its wheels is provided. The described preferred embodiments provide a wheel cover, wheel cover assembly and installation method which are easy to install and carry out, and can be quickly assembled for use on heavy duty vehicles.

The preferred embodiments of the illustrated mounting assemblies and associated wheel cover mounting methods improve the wheel cover installation and removal process since the methods require a reduced number of tools and can be accomplished faster and simpler, with fewer parts than existing wheel cover mounting methods and mechanisms.

A first preferred embodiment of the wheel cover assembly 9 of the present invention is shown in FIGS. 1-4 and includes a cover 10 for covering the outer surface of a wheel assembly including wheel 12. Cover 10 may be made of a solid member constructed out of aluminum, plastic or other durable material. In the alternative, cover 10 may be constructed of clear material such as clear plastic, Lexan® or similar durable clear material. In addition, cover 10 may include cut outs such as openings with an insert of clear plastic, Lexan® or similar durable clear material creating windows in cover 10. Such material may be full sheet or fitted inserts as required by the particular installation.

Wheel 12 is mounted on a hub, the central portion 14 of which extends through a central opening in the wheel 12. The hub has a plurality of parallel extending equally spaced threaded studs 16 to which the wheel is mounted. Wheel 12 has a central opening 18 through which the central portion 14 of the hub extends and a plurality of spaced holes (not shown) for receiving studs 16. Threaded on the distal end of each of the studs 16 is a nut 20 for securing the hub to the axle of the vehicle.

Figure 2:
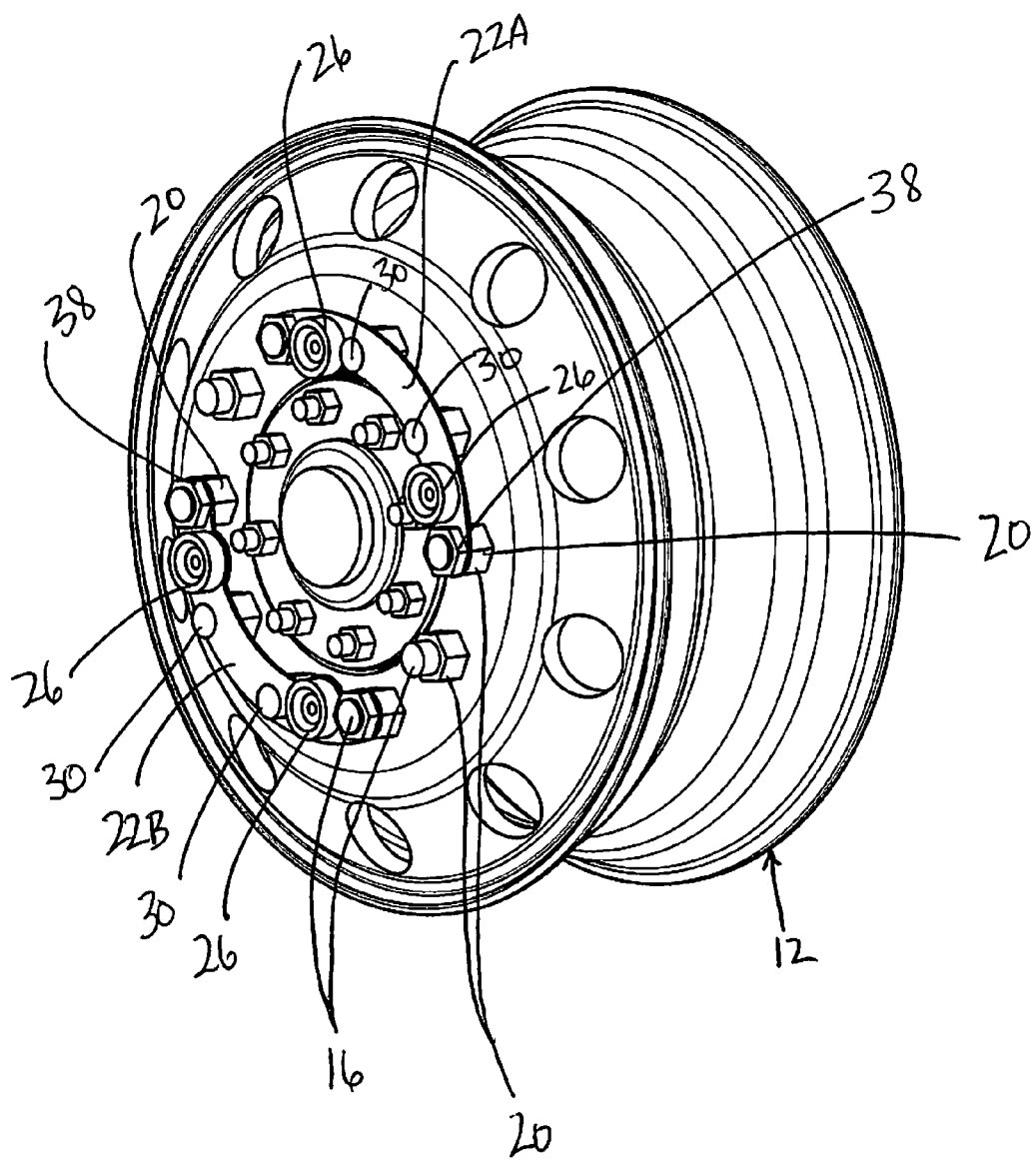
FIG. 2 is an isometric view of the preferred embodiment of the wheel cover assembly of FIG. 1 shown installed on a wheel.

Wheel cover assembly 9 includes a first retainer member such as quarter round mounting plates or brackets 22A and 22B having a planar portion such as back side 24A, 24B. Brackets 22A, 22B are arcuate and are preferably made of shaped sheet metal. Brackets 22A, 22B as shown in FIGS. 1 and 2 are positioned on wheel 12 such that they contact at least one of the parallel spaced studs 16. It may be appreciated by those skilled in the art that all elements of the wheel cover mounting assembly described herein may be made of a variety of materials including metal, plastic, carbon fiber, aluminum or other hardened material and such components are not being limited in their construction by preferred recitations herein (as described more generally above). Planar portion 24A of mounting bracket 22A contacts at least two of the parallel spaced studs 16. As shown in FIG. 2, bracket 22A is preferably positioned over studs 16 and in contact with nuts 20.

Figure 7:
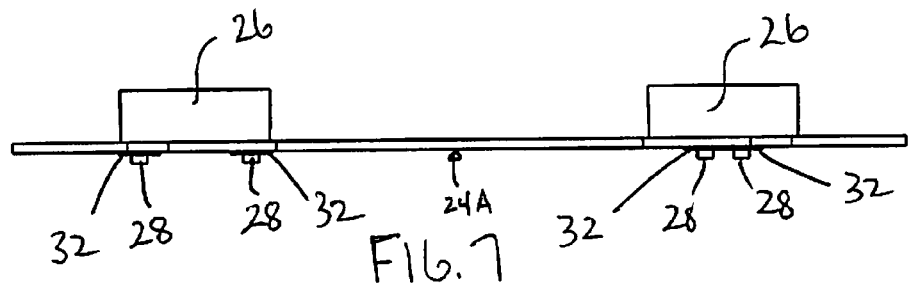
FIG. 7 is a top plan view of the retainer member of FIG. 5.
Figure 8:
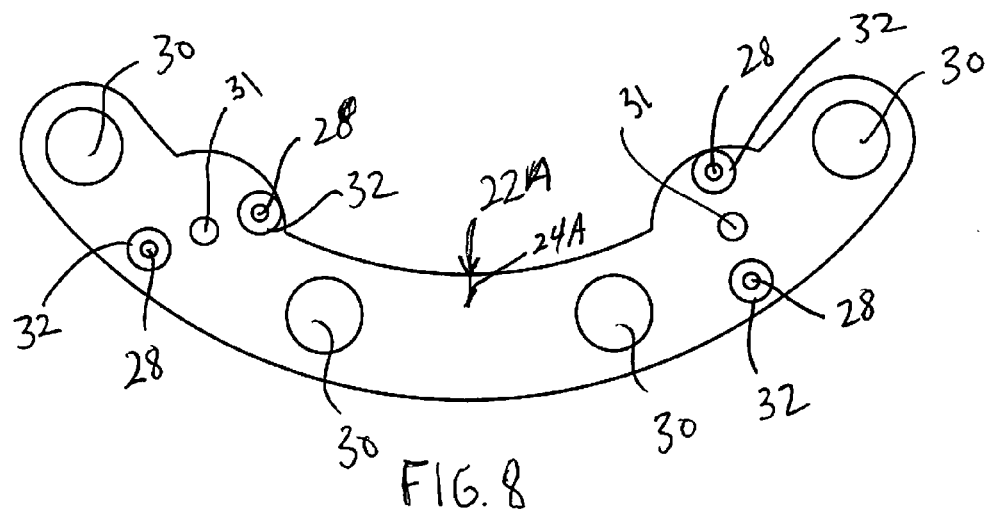
FIG. 8 is a rear plan view of the retainer member of FIG. 5.

Bracket 22A includes a first mounting member shown as receivers 26 attached to bracket 22A. It can be seen from FIGS. 7 and 8 that receivers 26 include mounting portions or posts 28 which pass through one of a plurality of apertures 31 in bracket 22A. Posts 28 also include locking members 32 which are positioned over posts 28 to secure receivers 26 to bracket 22A. It will be appreciated that receivers 26 may be made from plastic, rubber, nylon, aluminum or any other suitable material or polymer. Locking members 32 may be nuts, collets or any similar retaining structure to hold posts 28 in place on bracket 22A. A second retainer member in the form of a second bracket 22B having planar portion 24B (not shown) is included and is also positioned over at least two studs 16 and on top of lug nuts 20. Bracket 22B also includes receivers 26 having posts 28 and locking member 32 securing receiver 26 to bracket 22B through apertures (not shown) similar to that described above for bracket 22A.

As illustrated, brackets 22A, 22B are positioned across from each other by being positioned over opposed studs 16. It may be appreciated that while the illustrated preferred embodiment shows brackets 22A, 22B positioned 180 degrees opposed to one another, they may be positioned in a manner which allows for an offset which is less than 180 degrees opposite one another.

Figure 3:
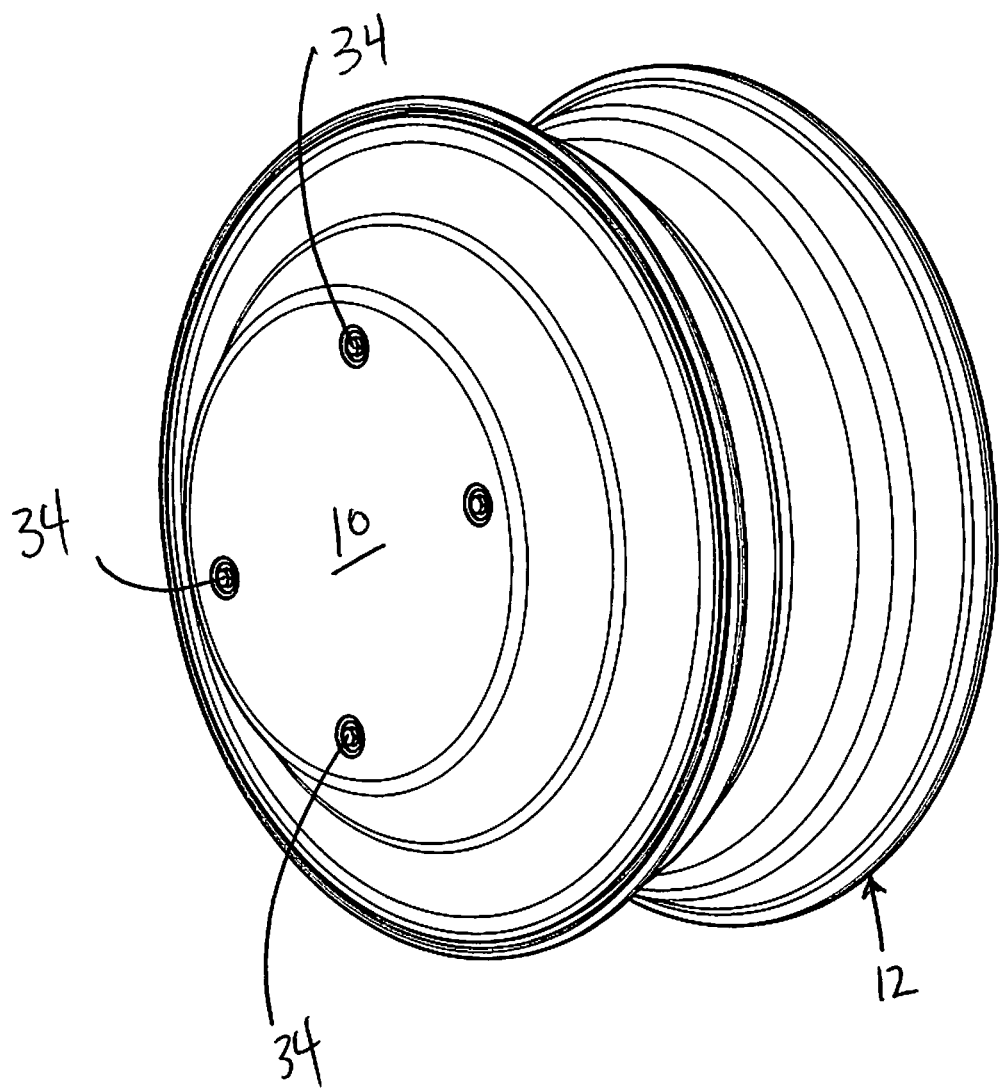
FIG. 3 is a further isometric view of the preferred embodiment of the attachment device shown in FIGS. 1 and 2 with an aerodynamic wheel cover installed thereon
Figure 4:
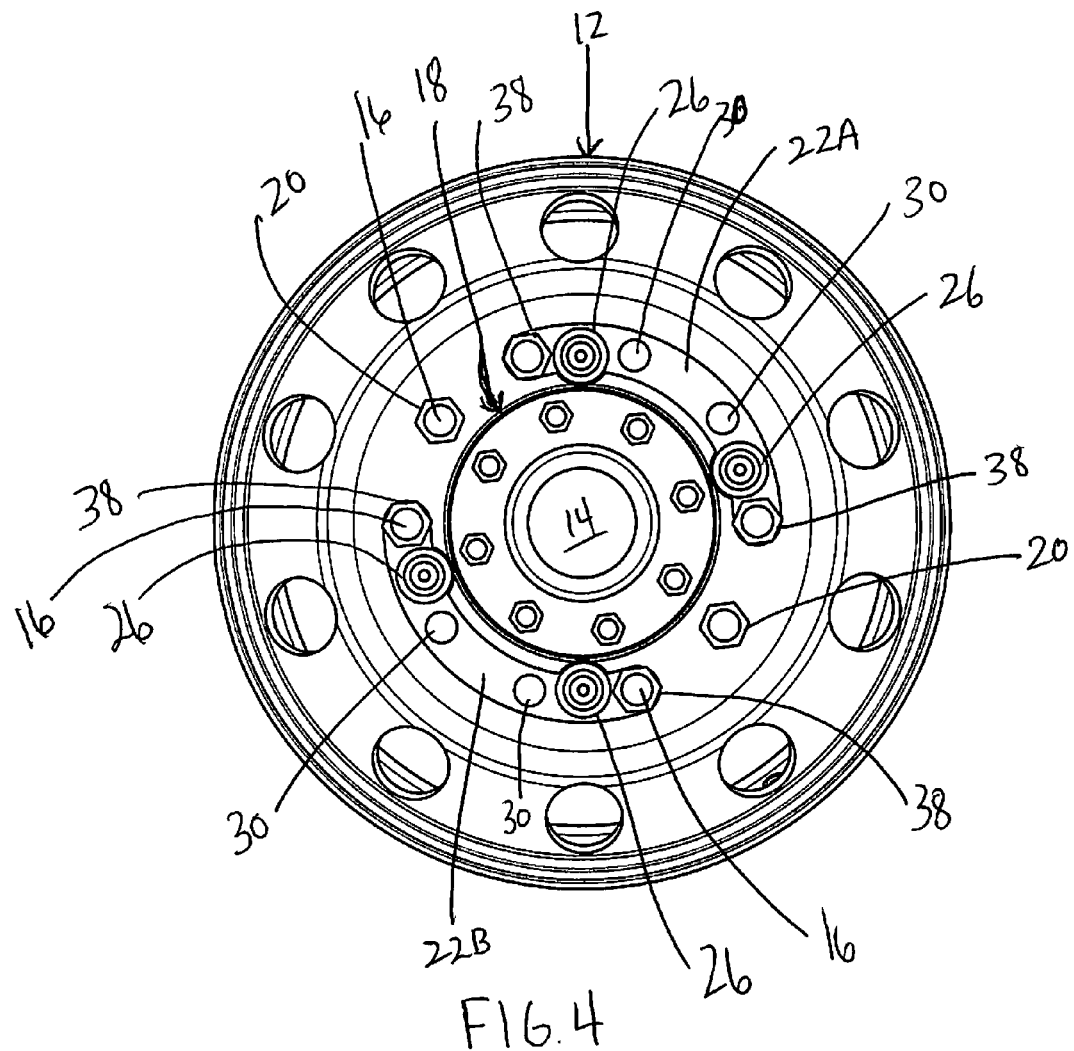
FIG. 4 is a front plan view of the preferred embodiment of FIGS. 1 and 2.
Figure 5:
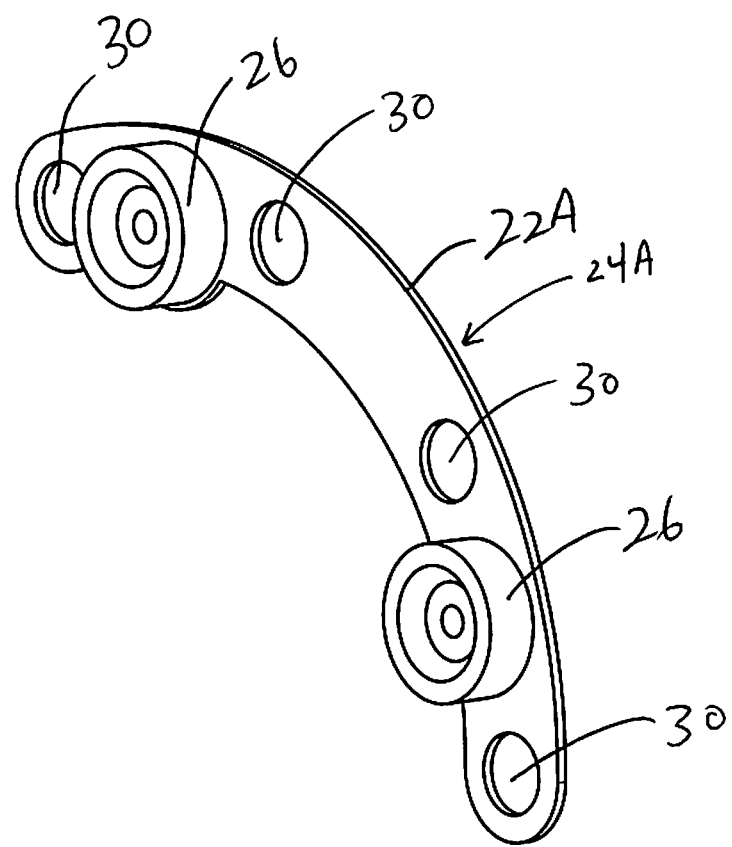
FIG. 5 is an perspective view of the retainer member shown in FIGS. 1, 2 and 4.
Figure 6:
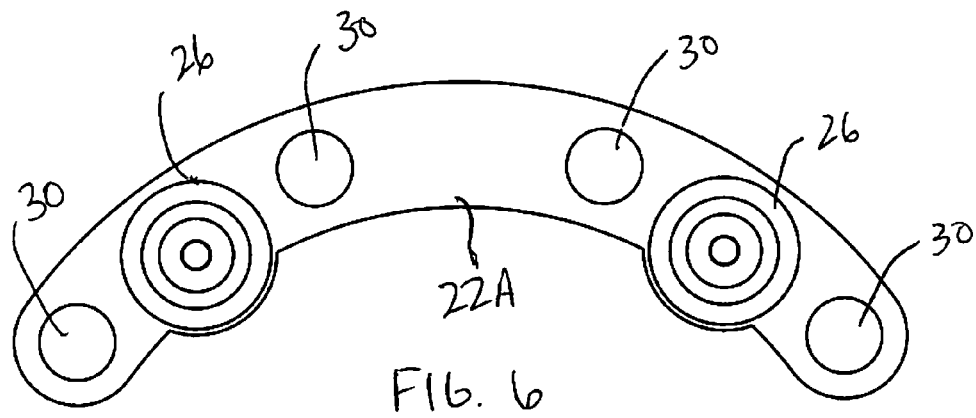
FIG. 6 is a front plan view of the retainer member of FIG. 5.

A first connecting member such as fasteners 34A, 34B are installed through apertures 36 in cover 10 for contacting receivers 26 on bracket 22A. Second connecting members such as fasteners 34C, 34D are installed through apertures 36 in cover 10 for contacting receivers 26 on bracket 22B. As can be seen in FIG. 3, cover 10 is positioned for installation over wheel 12 and fasteners 34A, 34B are in contact with receivers 26 on bracket 22A and fasteners 34C, 34D are in contact with receivers 26 on bracket 22B, cover 10 in held in position mounted to the wheel substantially covering wheel 12. In such installed position, the cover is positioned on the outside of wheel 12 but is spaced therefrom by a portion of the depth of receivers 26. This properly positions cover 10 with respect to the rim of wheel 12 to avoid unnecessary contact and an vibration which would cause contact of cover 10 with the rim of wheel 12.

In another preferred embodiment wheel cover assembly 9 includes brackets 22A, 22B positioned over lug nuts 20 which have been threaded on at least two studs 16. Brackets 22A, 22B are each affixed to respective parallel spaced studs with a threaded fastener such as jam nut 38. It may be appreciated that while the threaded fastener is illustrated as a nut, a variety of fastener types may be used to secure brackets 22A, 22B to wheel 12 depending on the application and particular installation requirements. Such fasteners may include but are not limited to threaded, partial turn, full turn, quick release, friction or the like.

It will also be appreciated that brackets 22A, 22B may be in contact with one or more studs 16 and attached nut 20. As illustrated in the preferred embodiments of FIGS. 1-8 brackets 22A, 22B are in contact with four studs 16 which protrude out from the wheel beyond the fully installed position of nuts 20 when they secure wheel 12 to a vehicle. The amount of excess stud 16 protruding beyond nut 20 may vary base on installation particulars and as such various fasteners may be used to install bracket 22A, 22B to wheel 12. It will also be appreciated that in one or more preferred embodiments brackets 22A, 22B may be positioned symmetrically across wheel 12 from one another. In yet other preferred embodiments, brackets 22A, 22B may be positioned on studs 16 which oppose one another in less than a perfectly symmetrical manner.

A method of mounting an aerodynamic cover 10 to wheel 12 of a vehicle is also illustrated in the preferred embodiments of FIGS. 1-8. As described above with references to FIGS. 1-8, the vehicle includes a hub surrounded by a plurality of parallel spaced studs 16. Each of the studs 16 having a longitudinal axis with a fixed distance between adjacent ones of the longitudinal axes. Wheel 12 includes an opening with a web having a plurality of spaced holes therein for receiving studs 16 and nuts 20 threaded on each of the studs. The method includes placing bracket 22A, 22B having planar portions 24A, 24B in contact with at least two studs 16. Brackets 22A, 22B include planar portions 24A, 24B having receivers 26 attached thereto. Bracket 22A is positioned across from bracket 22B when the brackets are in contact with respective studs 16. The method also includes placing fasteners 34A-34D in contact with brackets 22A, 22B and through apertures 36 in wheel cover 10 to mount cover 10 to wheel 12 and substantially covering the wheel.

Another preferred embodiment of the method includes placing fasteners 34A, 34B, 34C, 34D in contact with receivers 26 mounted and secured to brackets 22A, 22B. Brackets 22A, 22B may have one or more receivers 26 mounted thereon and fasteners 34A-34D may be positioned there through for connecting cover 10 to wheel 12. As noted above, brackets 22A, 22B may be positioned over two or more studs 16 when placed in position to receive fasteners 34A-34D. In addition, brackets 22A, 22B mat be symmetrically across from each other. Such symmetrical placement may be 180 degrees opposed from one another or at some angle less than or greater than 180 degrees therebetween.

Embodiments of the wheel assemblies, cover assemblies and mounting assemblies and components such as those described herein may be manufactured from metal, metal alloys, polymers including Lexan® or similar durable material. In some embodiments, components may be manufactured using computer numeric control (CNC) techniques. Some embodiments disclosed herein may be formed with CNC techniques on a three axis machine. Such CNC forming may allow for increasing or decreasing the scale, size or features of a device, and which may advantageously reduce production costs.

In some embodiments, common hardware or machined elements may be utilized and such may be constructed from a variety of materials, which may reduce overall complexity, reduce manufacturing costs, or provide other advantages. It will be appreciated by those skilled in the art that hardware including fasteners, connecting elements and the like may be common off-the-shelf parts of standard size. In addition, while specific component values and sizes have been shown for ease of illustration and description, it should be understood that a variety of sizes, combinations and types are possible and contemplated by the embodiments of the invention. Further, while specific connections have been used and shown for ease of description, it should also be understood that a variety of connection points are possible and may vary depending on the specifics of the application and construction used.

Reference throughout this specification to "one embodiment," "an embodiment," "preferred embodiment," or similar language means that a particular feature, structure, or characteristic described in connection with the embodiment is included in at least one embodiment of the present invention. Thus, appearances of the phrases "in one embodiment," "in an embodiment," "in a preferred embodiment," and similar language throughout this specification may, but do not necessarily, all refer to the same embodiment.

The embodiments of the present invention herein described and disclosed are presented merely as examples of the invention. Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. Other embodiments, forms and structures coming within the scope of this invention will readily suggest themselves to those skilled in the art, and shall be deemed to come within the spirit and scope of the invention.

What is claimed:

1. A wheel cover for covering a wheel of a vehicle, the vehicle having a hub surrounded by a plurality of parallel spaced studs, each of the studs having a longitudinal axis and there being a fixed distance between adjacent ones of the longitudinal axes, the wheel having a web with a plurality of holes therein for receiving the studs and a lug nut threaded on each of the parallel spaced studs to retain the wheel to the hub, the cover comprising:
   a first retainer member being a separate piece and curved and having a planar portion for contacting at least two of the parallel spaced studs, the planar portion having a first mounting member attached to the first retainer member;
   a second retainer member being a separate piece and curved and having a planar portion for contacting at least two of the parallel spaced studs, the planar portion having a second mounting member attached to the second retainer member, the second retainer member being positioned across from the first retainer member when in contact with the at least two parallel studs, the first retainer member being a separate piece from the second retainer member;
   a first connecting member for contacting the first mounting member; and
   a second connecting member for contacting the second mounting member;
   wherein when the cover is positioned for installation over the wheel and the first connecting member is in contact with the first mounting member and the second connecting member is in contact with the second mounting member, the cover is held in position mounted to the wheel substantially covering the wheel.

2. The wheel cover of claim 1 wherein the first connecting member and the second connecting member are each positioned over the lug nuts threaded on the at least two parallel spaced studs when in position contacting the at least two parallel spaced studs, the first connecting member and the second connecting member are each affixed to the respective at least two of the parallel spaced studs with a threaded fastener.

3. The wheel cover of claim 2 wherein the threaded fastener is a nut.

4. The wheel cover of claim 1 wherein the first connecting member for contacting the first mounting member and the second connecting member for contacting the second mounting member are threaded fasteners.

5. The wheel cover of claim 4 wherein the threaded fasteners are bolts.

6. The wheel cover of claim 1 wherein the first mounting member comprises two receivers for receiving the first connecting member.

7. The wheel cover of claim 6 wherein the two receivers for receiving the first connecting member are spaced from each other on the first retainer member.

8. The wheel cover of claim 1 wherein the second mounting member comprises two receivers for receiving the second connecting member.

9. The wheel cover of claim 8 wherein the two receivers for receiving the second connecting member are spaced from each other on the second retainer member.

10. The wheel cover of claim 1 wherein the planar portion of the first retainer member first retainer member contacts more than two of the parallel spaced studs and the planar portion of the second retainer contacts more than two of the parallel spaced studs.

11. The wheel cover of claim 10 wherein the planar portion of the first retainer member and the planar portion of the second retainer member are each placed in contact with the lug nuts on more than two of the spaced parallel studs.

12. The wheel cover of claim 1 wherein the second retainer member is positioned symmetrically across from the first retainer member when in contact with the at least two parallel studs.

13. A wheel cover assembly for covering a wheel of a vehicle, the vehicle having a hub surrounded by a plurality of parallel spaced studs, each of the studs having a longitudinal axis and there being a fixed distance between adjacent ones of the longitudinal axes, the wheel having a web with a plurality of holes therein for receiving the studs and a lug nut threaded on each of the parallel spaced studs to retain the wheel to the hub, the aerodynamic cover assembly comprising:
   a first retainer member being a separate piece and curved and having a planar portion for contacting at least two of the parallel spaced studs, the planar portion having a first mounting member attached to the first retainer member;
   a second retainer member being a separate piece and curved and having a planar portion for contacting at least two of the parallel spaced studs, the planar portion having a second mounting member attached to the second retainer member, the second retainer member being positioned across from the first retainer member when in contact with the at least two parallel studs, the first retainer member being a separate piece from the second retainer member;
   a first connecting member for contacting the first mounting member; and
   a second connecting member for contacting the second mounting member;
   an aerodynamic wheel cover attached to the first mounting member by the first connecting member and attached to the second mounting member by the second connecting member thereby substantially covering the wheel.

14. The wheel cover assembly of claim 13 wherein the first connecting member and the second connecting member are each positioned over the lug nuts threaded on the at least two parallel spaced studs when in position contacting the at least two parallel spaced studs, the first connecting member and the second connecting member are each affixed to the respective at least two of the parallel spaced studs with a threaded fastener.

15. The wheel cover assembly of claim 14 wherein the threaded fastener is a nut.

16. The wheel cover assembly of claim 13 wherein the first connecting member for contacting the first mounting member and the second connecting member for contacting the second mounting member are threaded fasteners.

17. The wheel cover assembly of claim 16 wherein the threaded fasteners are bolts.

18. The wheel cover assembly of claim 13 wherein the first mounting member comprises two receivers for receiving the first connecting member.

19. The wheel cover assembly of claim 18 wherein the two receivers for receiving the first connecting member are spaced from each other on the first retainer member.

20. The wheel cover assembly of claim 13 wherein the second mounting member comprises two receivers for receiving the second connecting member.

21. The wheel cover assembly of claim 20 wherein the two receivers for receiving the second connecting member are spaced from each other on the second retainer member.

22. The wheel cover assembly of claim 13 wherein the planar portion of the first retainer member first retainer member contacts more than two of the parallel spaced studs and the planar portion of the second retainer contacts more than two of the parallel spaced studs.

23. The wheel cover of claim 22 wherein the planar portion of the first retainer member and the planar portion of the second retainer member are each placed in contact with the lug nuts on more than two of the spaced parallel studs.

24. The wheel cover of claim 13 wherein the second retainer member is positioned symmetrically across from the first retainer member when in contact with the at least two parallel studs.

* * * * *